June 24, 1930.  LE ROY M. BICKETT  1,767,165
WEATHER STRIPPING
Filed Jan. 12, 1929

Inventor
L. M. Bickett
By
Attorneys

Patented June 24, 1930

1,767,165

UNITED STATES PATENT OFFICE

LE ROY M. BICKETT, OF WATERTOWN, WISCONSIN, ASSIGNOR TO BICKETT RUBBER PRODUCTS CORPORATION, OF WATERTOWN, WISCONSIN

WEATHER STRIPPING

Application filed January 12, 1929. Serial No. 332,101.

This invention relates to new and useful improvements in weather stripping.

One of the objects of my invention is the provision of a novel type of weather stripping especially adapted for use on motor vehicles and is so constructed as to readily receive a movable glass panel of the door, windshield or the like, and to so engage the glass panel that it will provide a substantially weather-proof contact.

Another object of my invention is the provision of an improved type of weather stripping to be used on motor vehicles which is formed in a single piece and so constructed that when a glass panel is forced between the walls thereof, the walls will be caused to frictionally contact with the glass panel so as to provide a thoroughly weather-proof joint.

A still further object of my invention is the provision of a novel type of weather stripping, formed with comparatively thick parallel side walls connected along one of the longitudinal edges with a comparatively thin transverse wall and with an intermediate wall of approximately the same thickness as the first transverse wall and positioned substantially midway between the longitudinal edges of the side walls so as to form a closed chamber and an opening groove, the groove receiving the edges of a glass panel and as the panel contacts the intermediate wall, the flexibility of this wall will cause the edges of the side walls forming the groove to move towards each other and clampingly engage the glass.

A still further object of my invention is the provision of a novel type of weather stripping providing a single piece of material, formed with an interior closed air pocket and is of such structure as to permit its ready application either to a motor vehicle or any other application where the device may be used.

With the above and other objects in view the invention consists in the novel features of construction, the combination and arrangement of parts hereinafter more fully set forth, pointed out in the claims and shown in the accompanying drawings wherein:—

In the present instance I have described and illustrated my improved weather stripping as specially adapted for use in motor vehicles and particularly for forming a weather tight joint between the body of the vehicle and the movable glass panels which are used in the doors and the windshield, but it will be readily apparent that this weather strip will be found equally as useful for various other purposes.

In the accompanying drawing, numeral 1 designates the upper cross piece of the windshield which is formed with a longitudinal groove 2.

As a general rule, the groove 2 is felt lined and receives therein the glass panel 3, but during any extensive use of the glass panel by raising or lowering the same, the lining of the groove 2 becomes worn and therefore a tight connection between the part 1 and the panel 3 cannot be obtained.

Figure 1:
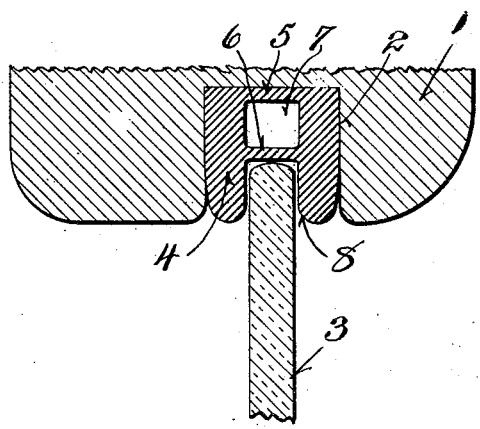
Figure 1 is a detailed transverse section, illustrating the application of my improved weather stripping.
Figure 2:
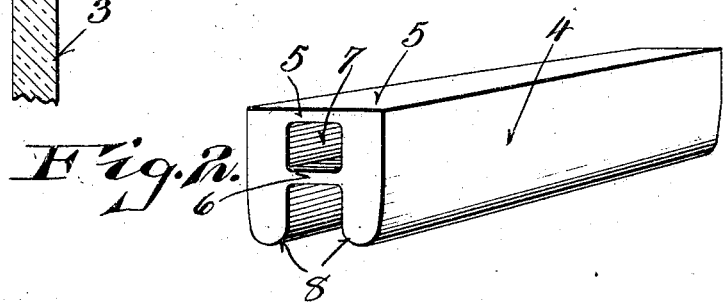
Figure 2 is a detailed perspective of a piece of stripping.
Figure 3:
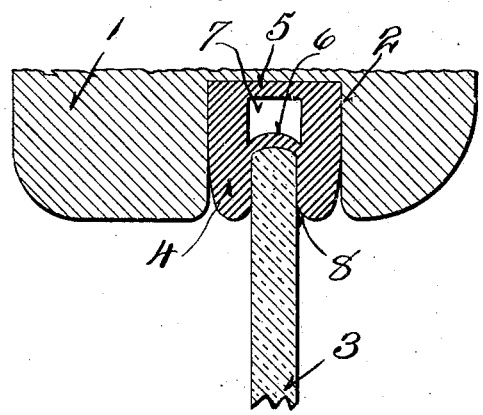
Figure 3 is a section similar to figure 1, showing the relative position of the weather stripping when a pane of glass is engaged therewith.

In figure 1, my improved weather stripping is illustrated in position in the groove 2 and, as noted the body of the strip comprises comparatively heavy parallel side walls 4 connected along their longitudinal edges by means of a transverse back wall 5. The side walls 4 are further connected intermediate their edges with a comparatively thin flexible wall 6.

It will be noted that by providing the intermediate wall 6 in the position set forth above, a closed air chamber 7 is formed in the stripping. It will be noted in figure 1 that the glass panel 3 is shown in position as it enters between the side walls 4, the outer longitudinal edges of the side walls 4 are rounded off as at 8 so that the rounded edge of the glass panel will readily contact with the rounded edges of the walls of the weather stripping and be readily guided into place.

As the glass panel 3 is moved inwardly between the walls 4 and contacts with the flexible wall 6, it will be noted that the inward movement of the wall 6 will cause the outer longitudinal edges of the walls 4 to be forced into contacting engagement with the panel 3, thus tightly gripping the edge of the panel 3 and form a comparatively weather-proof connection.

From the foregoing, it will be readily apparent that I have provided a simple and inexpensive type of weather-stripping which when in operative position as illustrated, will readily receive within the groove formed by the side walls, a panel of glass or other material, and through pressure exerted upon the panel, the panel will be forced into contact with the wall 6 and causing the outer longitudinal edges of the weather stripping to securely engage the panel in order to form a comparatively tight or weather-proof connection between the panel and strip.

While I have disclosed the device as particularly adapted for use on motor vehicles, it will be apparent that the same may be used for various purposes.

While I have shown and described the preferred embodiment of my invention, it will be apparent that slight changes may be made in the construction when putting the invention into practice without departing from the spirit of the same or the scope of the appended claims.

I claim:

1. A weather strip molded in a single piece and including a substantially U-shaped body with a flexible intermediate unbroken transverse wall connecting the sides of the U-shaped body at a point inwardly of the free edges thereof.

2. A weather strip molded in a single piece and including a U-shaped body having a flexible intermediate unbroken transverse wall between and integral with the side walls at approximately the longitudinal center of the body.

In testimony that I claim the foregoing I have hereunto set my hand at Milwaukee, in the county of Milwaukee, and State of Wisconsin.

LE ROY M. BICKETT.